United States Patent [19]
Sonoda et al.

[11] Patent Number: 5,707,732
[45] Date of Patent: Jan. 13, 1998

[54] FLAME RETARDANT CABLE

[75] Inventors: Masazumi Sonoda; Katsuhiro Horita, both of Kanagawa-ken, Japan

[73] Assignee: Nippon Unicar Company Limited, Tokyo, Japan

[21] Appl. No.: 677,941

[22] Filed: Jul. 10, 1996

[30] Foreign Application Priority Data

| Jul. 31, 1995 | [JP] | Japan | 7-214055 |
| Aug. 28, 1995 | [JP] | Japan | 7-242459 |
| Sep. 7, 1995 | [JP] | Japan | 7-255644 |

[51] Int. Cl.$^6$ ............... C09K 21/12; G02B 6/44
[52] U.S. Cl. ............... 428/357; 428/375; 428/920; 428/921; 524/436; 385/128
[58] Field of Search ............... 524/436; 428/920, 428/921, 357, 375; 388/128

[56] References Cited

U.S. PATENT DOCUMENTS

| 4,722,959 | 2/1988 | Inoue et al. | 524/412 |
| 4,791,160 | 12/1988 | Kato et al. | 524/322 |
| 5,132,350 | 7/1992 | Keogh | 524/267 |
| 5,191,004 | 3/1993 | Maringer et al. | 524/265 |
| 5,211,746 | 5/1993 | Keogh et al. | 106/18.26 |
| 5,262,467 | 11/1993 | Keogh et al. | 524/436 |
| 5,288,785 | 2/1994 | Jow et al. | 524/436 |
| 5,296,534 | 3/1994 | Senuma et al. | 524/436 |
| 5,317,051 | 5/1994 | Harashige et al. | 524/310 |
| 5,482,990 | 1/1996 | Jow et al. | 524/436 |

*Primary Examiner*—Richard Weisberger
*Attorney, Agent, or Firm*—Saul R. Bresch

[57] ABSTRACT

A cable comprising one or more electrical conductors or communications media, or a core of two or more electrical conductors or communications media, each electrical conductor, communications medium, or core being surrounded by a composition, which is essentially halogen free, comprising 100 parts by weight of a mixture of resins and 5 to 250 parts by weight of a flame retardant compound, which is either magnesium hydroxide, coated or uncoated, or aluminum trihydrate, wherein the resins in the mixture are as follows:

(i) a polyethylene made using a metallocene single site catalyst system, said polyethylene having an Mw/Mn ratio of no greater than about 3;

(ii) a polyethylene made using a transition metal catalyst system other than a metallocene single site catalyst system, said polyethylene having an Mw/Mn ratio greater than about 4;

(iii) optionally, a copolymer of ethylene and an unsaturated ester or a very low density polyethylene having a density no greater than 0.915 gram per cubic centimeter, wherein resins (i) or (ii) are modified with an unsaturated aliphatic diacid anhydride through grafting or copolymerization.

11 Claims, No Drawings

FLAME RETARDANT CABLE

TECHNICAL FIELD

This invention relates to a flame retardant cable having an insulating layer comprising a blend of resins in combination with a flame retardant filler.

BACKGROUND INFORMATION

A typical cable is constructed of metal conductors insulated with a polymeric material. These insulated conductors are generally twisted to form a core and are protected by another polymeric sheath or jacket material. In certain cases, added protection is afforded by inserting a wrap between the core and the sheath. In fiber optics cable, glass fibers are used instead of metal conductors, but a protective sheath is still necessary.

The requirements of these cables is that they exhibit exemplary flame retardancy, high and low temperature resistance, acid resistance, mechanical strength, insulating and jacketing properties, processability, flexibility, and resistance to whitening.

Conventional cables often contain a high pressure, low density homopolymer of ethylene (HP-LDPE), an ethylene/vinyl acetate copolymer (EVA), or an ethylene/ethyl acrylate copolymer (EEA) in combination with a flame retardant compound such as an organohalogen compound, an organophosphorus compound, or an inorganic compound such as magnesium hydroxide or aluminum trihydrate, the inorganic compounds being preferred.

Unfortunately, large amounts of inorganic compound are required in order to achieve commercially desirable flame retardancy. These large amounts of inorganic compound, however, reduce mechanical strength, and, in addition, increase susceptibility to the whitening phenomenon, which is caused by adsorption of atmospheric carbon dioxide by the inorganic compound to form an hydroxy metal carbonate. The whitening phenomenon not only affects the appearance of the insulation, but also lowers arc resistance, and insulation and mechanical properties.

DISCLOSURE OF THE INVENTION

An object of this invention, therefore, is to provide a flame retardant cable with optimal mechanical and insulation properties, essentially no whitening, and increased arc resistance. Other objects and advantages will become apparent herein after.

According to the present invention, the above object is met by a cable comprising one or more electrical conductors or communications media, or a core of two or more electrical conductors or communications media, each electrical conductor, communications medium, or core being surrounded by a composition, which is essentially halogen free, comprising 100 parts by weight of a mixture of resins and 5 to 250 parts by weight of a flame retardant compound, which is either magnesium hydroxide, coated or uncoated, or aluminum trihydrate, wherein the resins in the mixture are as follows:

(i) a polyethylene made using a metallocene single site catalyst system, said polyethylene having an Mw/Mn ratio of no greater than about 3;
(ii) a polyethylene made using a transition metal catalyst system other than a metallocene single site catalyst system, said polyethylene having an Mw/Mn ratio greater than about 4;
(iii) optionally, a copolymer of ethylene and an unsaturated ester or a very low density polyethylene having a density no greater than 0.915 gram per cubic centimeter, and resins (i) or (ii) are modified with an unsaturated aliphatic diacid anhydride through grafting or copolymerization.

DESCRIPTION OF THE PREFERRED EMBODIMENT(S)

Components (i) and (ii) in unmodified state can be copolymers of ethylene and alpha-olefins having 3 to 12 carbon atoms, preferably 3 to 8 carbon atoms, such as propylene, 1-butene, 1-hexene, 4-methyl-1-pentene, 1-octene, 1-decene and 1-dodecene. Among these alpha-olefins, 1-octene is desirable because flame-retardant ethylene/1-octene compositions exhibit especially good mechanical properties and processability. The term "copolymer" as used in this specification means a polymer derived from the polymerization of two or more monomers and, thus, includes, for example, terpolymers and tetramers.

A preferred component (i) ethylene/alpha-olefin copolymer is a linear very low density ethylene/alpha-olefin copolymer having a density in the range of 0.860 to 0.910 gram per cubic centimeter; a melt flow rate of about 0.5 to about 50 grams per 10 minutes; and a molecular weight distribution (Mw/Mn) of less than about 3, and preferably less than about 2.5.

Melt flow rate is measured in accordance with JIS (Japanese Industrial Standard) K7210. Density is measured in accordance with JIS K7112. The molecular weight distribution (Mw/Mn) is measured by size discharge chromatography.

The single-site metallocene catalyst system used to provide component (i) can also be referred to as a metallocene catalyst or a Kaminsky catalyst. A preferred single site metallocene catalyst system can be described as a constrained geometry catalyst containing a metal coordination complex comprising a metal of groups 3 to 10 or the Lanthanide series of the Periodic Table of the Elements and a delocalized n-bonded moiety substituted with a constraint-inducing substituent, said complex having a constrained geometry about the metal atom such that the angle of the metal between the centroid of the delocalized, substituted π-bonded moiety and the center of at least one remaining substituent is less than such angle in a similar complex containing a similar π-bonded moiety lacking in such a constraint-inducing substituent, and provided further that for such complexes comprising more than one delocalized, substituted π-bonded moiety, there is only one cyclic, delocalized, substituted π-bonded moiety for each metal atom of the complex.

The catalyst system further comprises an activating cocatalyst. Preferred catalyst complexes are represented by the following formula:

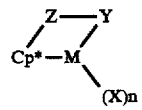

wherein:

M is a metal of groups 3 to 10 or the Lanthanide series of the Periodic Table of the Elements; Cp* is a cyclopentadienyl or substituted cyclopentadienyl group bound in a η5 bonding mode to M; z is a moiety comprising boron, sulfur, or oxygen, said moiety having up to 20 non-hydrogen atoms, and optionally Cp* and 2 together form a fused ring system; each X is independently each an anionic ligand group or neutral Lewis base ligand group having up to 30 non-hydrogen atoms; n is 0 or 1 to 4 and is 2 less than the valence of M; and y is an anionic or nonanionic ligand group bonded to z and M comprising nitrogen, phosphorus, oxygen, or sulfur and having up to 20 non-hydrogen atoms, optionally, forming a fused ring system.

Examples of preferred metal coordination compounds include (tert-butylamido) (tetramethyl-η5-cyclopentadienyl)-1,2-ethanediylzirconium dichloride, (tert-butylamido) (tetramethyl-η5-cyclopentadienyl)1,2-ethanediyltitanium dichloride, (methylamido) (tetramethyl-η5-cyclopentadienyl)-1,2-ethanediylzirconium dichloride, (methylamido) (tetramethyl-η5-cycloperitadienyl)-1,2-ethanediyltitanium dichloride, (ethylamido) (tetramethyl-η5-cyclopentadienyl) methylenetitanium dichloride, (tert-butylamido)dibenzyl(tetramethyl-η5-cyclopentadienyl) silanezirconium dibenzyl, (benzylamido)dimethyl(tetramethyl-η5-cyclopenta-dienyl) silanetitanium dichloride, (phenylphosphido) dimethyl (tetramethyl-η5-cyclopentadienyl)-silanezirconium dibenzyl, and (tertbutylamido) dimethyl (tetramethyl-η5-cyclopentadienyl) silanetitanium dimethyl.

Suitable cocatalysts for use in single site metallocene catalyst systems include polymeric or oligomeric alumoxanes, especially methyl alumoxane, dimethyl alumoxane, or modified methyl alumoxane.

Other examples of single site metallocene catalyst systems can be found in U.S. Pat. Nos. 5,272,236 and 5,317,036.

The polymerization for the production of component (i) can be accomplished at conditions well known in the prior art for Ziegler-Natta or Kaminsky-Sinn type polymerization reactions, that is, temperatures from 0 to 250 degrees C., and pressures from atmospheric to 1000 atmospheres (100 MPa). Suspension, solution, slurry, or gas phase can be employed.

A support can be used, but the catalysts are preferably utilized in a homogeneous manner. It will, of course, be appreciated that an active catalyst system, especially non-ionic catalysts, will form in situ if the catalyst and the cocatalyst components are added directly to the polymerization reactor together with a suitable solvent or diluent including condensed monomer(s). It is, however, preferred to form the active catalyst in a separate step in a suitable solvent prior to adding same to the polymerization mixture.

A detailed description of a production method for ethylene/alpha-olefin copolymers can be found in Japanese Laid-open Patent HEX 6-30621 and Japanese International Publication HEI 7-500622.

The linear ethylene/alpha-olefin copolymer referred to as component (ii) above, in unmodified form, can have a melt flow rate in the range of about 0.1 to about 50 grams per 10 minutes and a density in the range of about 0.860 to 0.950 gram per cubic centimeter. The copolymer can be any ethylene/alpha-olefin copolymer produced by conventional methods using Ziegler-Natta catalyst systems, Phillips catalyst systems, or other transition metal catalyst systems. Thus, the copolymer can be a very low density polyethylene (VLDPE), referred to below, a linear low density polyethylene (LLDPE), also referred to below, a medium density polyethylene (MDPE) having a density in the range of 0.926 to 0.940 gram per cubic centimeter, or a high density polyethylene (HDPE) having a density greater than 0.940 gram per cubic centimeter. As noted, component (ii) is differentiated from component (i) in that it is not prepared with a single site metallocene catalyst system.

Components (i) or (ii) are modified with an unsaturated aliphatic diacid anhydride through grafting or copolymerization. Examples of these anhydrides are maleic anhydride, itaconic anhydride, citraconic anhydride, 5-norbornene-2,3-dicarboxylic anhydride, 4-methylcyclohexene-1,2-dicarboxylic anhydride, 4-cyclohexene-1,2-dicarboxylic anhydride.

The proportions of the resins in the mixture of resins, based on 100 parts by weight of the mixture of resins, is as follows (in parts by weight):

In the case where components (i) and (ii) make up the mixture, there can be about 55 to about 98 parts of component (i) and about 2 to about 45 parts of component (ii) and there is preferably about 65 to about 88 parts of component (i) and about 12 to about 35 parts of component (ii).

In the case where components (i), (ii), and (iii) make up the mixture, there can be about 5 to about 35 parts of component (i), about 5 to about 35 parts of component (ii), and about 60 to about 90 parts of component (iii), and there is preferably about 10 to about 20 parts of component (i), about 10 to about 20 parts of component (ii), and about 70 to about 80 parts of component (iii).

In the case where components (i) and (iii) make up the mixture, there can be about 2 to about 40 parts of component (i), and about 60 to about 98 parts of component (iii), and there is preferably about 12 to about 30 parts of component (i) and about 70 to about 88 parts of component (iii). In addition, less hydrated filler can be used and is desirable for this combination, i.e., up to 150 parts by weight of hydrated filler per 100 parts by weight of the resin mixture.

With respect to component (iii), copolymers comprised of ethylene and unsaturated esters are well known, and can be prepared by conventional high pressure techniques. The unsaturated esters of interest here are the alkyl acrylates, the alkyl methacrylates, and the vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. The portion of the copolymer attributed to the ester comonomer can be in the range of about 5 to about 50 percent by weight based on the weight of the copolymer, and is preferably in the range of about 15 to about 40 percent by weight. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. The melt index of the ethylene/unsaturated ester copolymers can be in the range of about 0.5 to about 50 grams per 10 minutes, and is preferably in the range of about 2 to about 25 grams per 10 minutes. The melt index is determined in accordance with ASTM D-1238, Condition E, measured at 190° C. One process for the preparation of a copolymer of ethylene and an unsaturated ester is described in U.S. Pat. No. 3,334,081.

Component (iii) can also be a very low density polyethylene (VLDPE). The VLDPE can be a copolymer of ethylene and one or more alpha-olefins having 3 to 12 carbon atoms and preferably 3 to 8 carbon atoms, and, thus, can be used as components (i), (ii), or (iii) provide that the single site metallocene catalysts are used to make component (i) and other catalysts are used for components (ii) and (iii). The density of the VLDPE can be in the range of 0.870 to 0.915 gram per cubic centimeter. It can be produced, for example, in the presence of (i) a catalyst containing chromium and titanium, (ii) a catalyst containing magnesium, titanium, a halogen, and an electron donor; or (iii) a catalyst containing vanadium, an electron donor, an alkyl aluminum halide modifier, and a halocarbon promoter. Catalysts and processes for making the VLDPE are described, respectively, in U.S. Pat. Nos. 4,101,445; 4,302,565; and 4,508,842. The melt index of the VLDPE can be in the range of about 0.1 to about 20 grams per 10 minutes and is preferably in the range of about 0.3 to about 5 grams per 10 minutes. The portion of the VLDPE attributed to the comonomer(s), other than ethylene, can be in the range of about 1 to about 49 percent by weight based on the weight of the copolymer and is preferably in the range of about 15 to about 40 percent by weight. A third comonomer can be included, e.g., another alpha-olefin or a diene such as ethylidene norbornene, butadiene, 1,4-hexadiene, or a dicyclopentadiene. The third comonomer can be present in an amount of about 1 to 15 percent by weight based on the weight of the copolymer and is preferably present in an amount of about 1 to about 10 percent by weight. It is preferred that the copolymer contain two or three comonomers inclusive of ethylene.

The LLDPE can include the VLDPE and MDPE, which are also linear, but, generally, has a density in the range of 0.916 to 0.915 gram per cubic centimeter. It can be a copolymer of ethylene and one or more alpha-olefins having 3 to 12 carbon atoms, and preferably 3 to 8 carbon atoms. The melt index can be in the range of about 1 to about 20 grams per 10 minutes, and is preferably in the range of about 3 to about 8 grams per 10 minutes. The alpha-olefins can be the same as those mentioned above, and the catalysts and processes are also the same subject to variations necessary to obtain the desired densities and melt indices. Again, for component (i), a single site metallocene catalyst is used, whereas for components (ii) and (iii), other conventional polyethylene catalysts are used.

As noted above, either component (i) or component (ii) can be modified with an anhydride of an unsaturated aliphatic diacid. The modification can be accomplished in two ways. One is by grafting and the other is by copolymerization. Both techniques are conventional. The anhydrides can have 4 to 20 carbon atoms and preferably have 4 to 10 carbon atoms. Examples of anhydrides, which are useful in this invention, are maleic anhydride, itaconic anhydride, and nadic anhydride. The preferred anhydride is maleic anhydride. Excess anhydride, if present after grafting, can be removed by devolatilization at temperatures in the range of about 200° C. to about 250° C.

The grafting can be accomplished by using an organic peroxide catalyst, i.e., a free radical generator, such as dicumyl peroxide; lauroyl peroxide; benzoyl peroxide; tertiary butyl perbenzoate; di(tertiary-butyl) peroxide; cumene hydroperoxide; 2,5-dimethyl- 2,5-di(t-butylperoxy)hexyne-3,2,5-dimethyl-2,5-di(t-butyl-peroxy)hexane; tertiary butyl hydroperoxide; isopropyl percarbonate; and alpha,alpha'-bis (tertiary-butylperoxy)diisopropylbenzene. The organic peroxide catalyst may be added together with the anhydride. Grafting temperatures can be in the range of about 100° to about 300° C. and are preferably in the range of abut 150° to about 200° C. A typical procedure for grafting maleic anhydride onto polyethylene is described in U.S. Pat. No. 4,506,056.

Grafting can also be accomplished by adding a solution of anhydride, an organic peroxide catalyst, and an organic solvent to polyethylene in particulate form. The organic peroxide catalyst is soluble in the organic solvent. Various organic solvents, which are inert to the reaction, can be used. Examples of useful organic solvents are acetone, methyl ethyl ketone, methyl propyl ketone, 3-pentanone, and other ketones. Other carrier solvents which allow solubilization of peroxide and anhydride, and which strip off well under appropriate devolatilization conditions may be used. Acetone is a preferred solvent because it acts as a stripping agent for residuals such as non-grafted anhydride or anhydride by-products. The anhydride solution can contain abut 10 to about 50 percent by weight anhydride; about 0.05 to about 5 percent by weight organic peroxide catalyst; and about 50 to about 90 percent by weight organic solvent based on the total weight of the solution. A preferred solution contains about 20 to about 40 percent anhydride; about 0.1 to about 2 percent peroxide; and about 60 to about 80 percent solvent.

The anhydride grafted polymer can contain about 0.05 to about 5 parts by weight or anhydride per 100 parts by weight of polymer and preferably contains about 0.1 to about 2 parts by weight of anhydride per 100 parts by weight of polymer.

Anhydride modification can also be accomplished by copolymerization, for example, by the copolymerization ethylene, ethyl acrylate, and maleic anhydride. The polymerization technique is conventional, and is similar to the polymerization of the underlying comonomers, i.e., ethylene and one or more alpha-olefins. Reference can be made to Maleic Anhydride, Trivedi et al., Plenum Press, New York, 1982, Chapter 3, section 3-2. This treatise also covers grafting.

The various copolymers can be crosslinked in a conventional manner, if desired. Crosslinking is usually accomplished with an organic peroxide, examples of which are mentioned above with respect to grafting. The amount of crosslinking agent used can be in the range of about 0.5 to about 4 parts by weight of organic peroxide for each 100 parts by weight of ethylene/unsaturated ester copolymer, and is preferably in the range of about 1 to about 3 parts by weight. Crosslinking can also be effected with irradiation or moisture, or in a mold, according to known techniques. Crosslinking temperatures can be in the range of about 150 to about 250 degrees C. and are preferably in the range of about 170 to about 210 degrees C.

The copolymers can also be made hydrolyzable so that they can be moisture cured. This is accomplished by grafting the copolymer with, for example, an alkenyl trialkoxy silane in the presence of an organic peroxide (examples are mentioned above), which acts as a free radical generator or catalyst. Useful alkenyl trialkoxy silanes include the vinyl trialkoxy silanes such as vinyl trimethoxy silane, vinyl triethoxy silane, and vinyl triisopropoxy silane. The alkenyl and alkoxy radicals can have 1 to 30 carbon atoms and preferably have 1 to 12 carbon atoms. The hydrolyzable polymers are moisture cured in the presence of a silanol condensation catalyst such as dibutyl tin dilaurate, dioctyl tin maleate, stannous acetate, stannous octoate, lead naphthenate, zinc octoate, iron 2-ethyl hexoate, and other metal carboxylates. The organic peroxides can be the same as those mentioned above for crosslinking.

The resins can be crosslinked and made hydrolyzable, if desired, using the same techniques described above for the ethylene/unsaturated ester copolymer.

As hydrated inorganic flame retardant fillers, magnesium hydroxide (preferred) or alumina trihydrate are used. While conventional off-the-shelf magnesium hydroxide and alumina trihydrate can be used, a preferred magnesium hydroxide has the following characteristics: (a) a strain in the <101> direction of no more than $3.0 \times 10^{-3}$; (b) a crystallite size in the <101> direction of more than 800 angstroms; and (c) a surface area, determined by the BET method, of less than 20 square meters per gram. The preferred magnesium hydroxide and a method for its preparation are disclosed in U.S. Pat. No. 4,098,762. A preferred characteristic of this magnesium hydroxide is that the surface area, as determined by the BET method, is less than 10 square meters per gram.

The amount of hydrated filler used in the composition can be in the range of about 5 to about 250 parts by weight of hydrated filler per 100 parts by weight of the mixture of resins, and is preferably present in the range of about 100 to about 230 parts by weight of hydrated filler per 100 parts by weight of the resin mixture. In the case of the component (i) and (iii) mixture, an upper limit of 150 parts by weight is preferred.

The hydrated filler can be surface treated (coated) with a saturated or unsaturated carboxylic acid having about 8 to about 24 carbon atoms and preferably about 12 to about 18 carbon atoms or a metal salt thereof, but coating is optional. Mixtures of these acids and/or salts can be used, if desired. Examples of suitable carboxylic acids are oleic, stearic, palmtic, isostearic, and lauric; of metals which can be used to form the salts of these acids are zinc, aluminum, calcium, magnesium, and barium; and of the salts themselves are magnesium stearate, zinc oleate, calcium palmitate, magnesium oleate, and aluminum stearate. The amount of acid or salt can be in the range of about 0.1 to about 5 parts of acid and/or salt per one hundred parts of metal hydrate and is preferably about 0.25 to about 3 parts per one hundred parts of metal hydrate. The surface treatment is described in U.S. Pat. No. 4,255,303. The acid or salt can be merely added to the composition in like amounts rather than using the surface treatment procedure, but this is not preferred.

Various conventional additives can be added to the expandable resin composition prior to or during the mixing of the components, and prior to or during extrusion. The additives include antioxidants, ultraviolet absorbers or stabilizers, antistatic agents, pigments, dyes, nucleating agents, reinforcing fillers or polymer additives, resistivity modifiers such as carbon black, slip agents, plasticizers, processing aids, lubricants, viscosity control agents, tackifiers, anti-blocking agents, surfactants, extender oils, metal deactivators, voltage stabilizers, fillers, flame retardant additives, crosslinking boosters and catalysts, and smoke suppressants. Additives can be added in amounts ranging from less than about 0.1 to more than about 5 parts by weight for each 100 parts by weight of the resin. Fillers are generally added in larger amounts up to 200 parts by weight or more.

Examples of antioxidants are: hindered phenols such as tetrakis[methylene(3,5-di-tert-butyl-4-hydroxyhydrocinnamate)]-methane, bis[(beta-(3,5-ditert-butyl-4-hydroxybenzyl)methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenylphosphonite; thio compounds such as dilaurylthiodipropionate, dimyristylthiodipropionate, and distearylthiodipropionate; various siloxanes; and various amines such as polymerized 2,2,4-trimethyl-1,2-dihydroquinoline. Antioxidants can be used in amounts of about 0.1 to about 5 parts by weight per 100 parts by weight of resin.

The resin composition can be mixed and the cable coated with the resin composition can be prepared in various types of extruders, some of which are described in U.S. Pat. Nos. 4,814,135; 4,857,600; 5,076,988; and 5,153,382. All types of single screw and twin screw extruders and polymer melt pumps and extrusion processes will generally be suitable in effecting the process of this invention as long as they are adapted for mixing or foaming. A typical extruder, commonly referred to as a fabrication extruder will have a solids feed hopper at its upstream end and a melt forming die at its downstream end. The hopper feeds unfluxed plastics into the feed section of a barrel containing the processing screw(s) that flux and ultimately pump the plastic melt through the forming die. At the downstream end, between the end of the screw and the die, there is often a screen pack and a die or breaker plate. Fabrication extruders typically accomplish the mechanisms of solids conveying and compression, plastics fluting, melt mixing and melt pumping although some two stage configurations use a separate melt fed extruder or melt pump equipment for the melt pumping mechanism. Extruder barrels are equipped with barrel heating and cooling features for startup and improved steady state temperature control. Modern equipment usually incorporates multiple heating/cooling zones starting at the rear feed zone and segmenting the barrel and downstream shaping die. The length to diameter ratio of each barrel is in the range of about 15:1 to about 30:1.

As noted, subject cable comprises one or more electrical conductors or communications media, or a core of two or more electrical conductors or communications media, each electrical conductor, communications medium, or core being surrounded by an insulating composition. The electrical conductors are generally copper and the communications media are generally fiber optics made of glass fibers.

This specification is based on Japanese patent application 7-214055 filed in Japan on Jul. 31, 1995; Japanese patent application 7-242459 filed in Japan on Aug. 28, 1995; and Japanese patent application 7-255644 filed in Japan on Sep. 7, 1995 for which priority is claimed. In all cases, the applicant is Nippon Unicar Company Limited and the inventors are Sonoda et al.

Patents and other publications mentioned in this specification are incorporated by reference herein.

The invention is illustrated by the following examples.

Example 1

95 parts by weight of ethylene/1-octene copolymer made by using the single-site metallocene catalyst described above (density=0.900 gram per cubic centimeter; melt flow rate= 0.8 gram per 10 minutes; Mw/Mn=2.4); 5 parts by weight of an ethylene/1-butene copolymer (density=0.920 gram per cubic centimeter; melt flow rate=0.7 gram per 10 minutes; Mw/Mn=4.5) modified with 0.5 part by weight of maleic acid anhydride; 220 parts by weight of magnesium hydroxide coated with stearic acid; and 0.5 parts by weight of antioxidant, tetrakis [methylene (3,5-di-tert-butyl-4-hydroxyhydrocinnamate)]methane, are kneaded at 160 degrees C. for 10 minutes in a Banbury™ mixer to form pellets. The pellets are heated at 150 degrees C., and a pressure of 100 kilograms per cubic centimeter for 3 minutes in a heat press molding machine and punched into dumbbell specimens having a thickness of 3 millimeters. The Limited Oxygen Index (LOI) is found to be 31; the tensile strength is 198 grams per square centimeter; the elongation is 630 percent; the acid resistance test with dilute sulfuric acid for 7 days results in a decrease of 10 percent by weight; the carbon dioxide gas whitening test results in an increase of 2.1 percent by weight.

Example 2

70 weight parts of a ethylene/vinyl acetate copolymer having a melt flow rate 1.5 grams per 10 minutes and a comonomer (vinyl acetate) content of 18 percent by weight; 30 parts by weight of ethylene/1-octene copolymer made by using a single-site metallocene catalyst (density=0.900 gram per cubic centimeter; melt flow rate=0.8 grams per 10 minutes; Mw/Mn=2.4); and 120 parts by weight of magnesium hydroxide coated with stearic acid; and 0.5 part by weight of antioxidant, (tetrakis [methylene (3.5-di-tert-butyl-4-hydroxyhydrocinnamate)]methane) are kneaded at 160 degrees C. for 10 minutes in a Banbury™ mixer to form pellets. The pellets are heated at 150 degrees C. at a pressure of 100 kilograms per cubic centimeter for 3 minutes in a heat press molding machine and punched into dumbbell specimens having a thickness of 3 millimeters. The specimens have an LOI of 31; a tensile strength of 123 grams per square centimeter; and an elongation of 650 percent.

Example 3

95 parts by weight of a ethylene/ethyl acrylate copolymer having a melt flow rate of 1.3 grams per 10 minutes and a comonomer (ethyl acrylate) content of 15 percent by weight; 5 parts by weight of a maleic anhydride (0.5 percent by weight) modified ethylene/1-octene copolymer made by using single-site metallocene catalyst (the copolymer, prior to modification, having a density=0.900 gram per cubic centimeter; a melt flow rate=0.8 gram per 10 minutes; Mw/Mn=2.4); 120 parts by weight of magnesium hydroxide coated with stearic acid; and 0.5 parts by weight of antioxidant, (tetrakis [methylene (3.5-di-tert-butyl-4-hydroxyhydrocinnamate)]methane) are kneaded at 160 degrees C. for 10 minutes in a Banbury™ mixer to form pellets. The pellets are heated at 150 degrees C. and a pressure of 100 kilograms per cubic centimeter for 3 minutes in a heat press molding machine and punched into dumbbell specimens having a thickness of 3 millimeters. The LOI is 31; the tensile strength is 75 grams per square centimeter; the elongation is 650 percent; the acid resistance test in dilute sulfuric acid for 7 days results in a 10 percent by weight decrease; the carbon dioxide gas whitening test result in a n increase of 2.2 percent by weight.

We claim:

1. A cable comprising one or more electrical conductors or communications media, or a core of two or more electrical conductors or communications media, each electrical conductor, communications medium, or core being surrounded by a composition, which is essentially halogen free, comprising 100 parts by weight of a mixture of resins and 5 to 250 parts by weight of a flame retardant compound, which is either magnesium hydroxide, coated or uncoated, or aluminum trihydrate, wherein the resins in the mixture are as follows:

(i) about 55 to about 98 parts by weight of a polyethylene made using a metallocene single site catalyst system, said polyethylene having an Mw/Mn ratio of no greater than about 3; and (ii) about 2 to about 45 parts by weight of a polyethylene made using a transition metal catalyst system other than a metallocene single site catalyst system, said polyethylene having an Mw/Mn ratio greater than about 4;

wherein resins (i) or (ii) are modified with an unsaturated aliphatic diacid anhydride through grafting or copolymerization.

2. A cable comprising one or more electrical conductors or communications media, or a core of two or more electrical conductors or communications media, each electrical conductor, communications medium, or core being surrounded by a composition, which is essentially halogen free, comprising 100 parts by weight of a mixture of resins and 5 to 250 parts by weight of a flame retardant compound, which is either magnesium hydroxide, coated or uncoated, or aluminum trihydrate, wherein the resins in the mixture are as follows:

(i) about 5 to about 35 parts by weight of a polyethylene made using a metallocene single site catalyst system, said polyethylene having an Mw/Mn ratio of no greater than about 3;

(ii) about 5 to about 35 parts by weight of a polyethylene made using a transition metal catalyst system other than a metallocene single site catalyst system, said polyethylene having an Mw/Mn ratio greater than about 4; and (iii) about 60 to about 90 parts by weight of a copolymer of ethylene and an unsaturated ester or a very low density polyethylene having a density no greater than 0.915 gram per cubic centimeter wherein resins (i) or (ii) are modified with an unsaturated aliphatic diacid anhydride through grafting or copolymerization.

3. A cable comprising one or more electrical conductors or communications media, or a core of two or more electrical conductors or communications media, each electrical conductor, communications medium, or core being surrounded by a composition, which is essentially halogen free, comprising 100 parts by weight of a mixture of resins and 5 to 250 parts by weight of a flame retardant compound, which is either magnesium hydroxide, coated or uncoated, or aluminum trihydrate, wherein the resins in the mixture are as follows:

(i) about 2 to about 40 parts by weight of a polyethylene made using a metallocene single site catalyst system, said polyethylene having an Mw/Mn ratio of no greater than about 3; and (ii) about 60 to about 98 parts by weight of a copolymer of ethylene and an unsaturated ester or a very low density polyethylene having a density no greater than 0.915 gram per cubic centimeter wherein resin (i) is modified with an unsaturated aliphatic diacid anhydride through grafting or copolymerization.

4. The cable defined in claim 3 wherein the flame retardant compound is present in an amount of about 5 to about 150 parts by weight.

5. The cable defined in claim 1 wherein resin (i) is modified with an unsaturated aliphatic diacid anhydride.

6. The cable defined in claim 1 wherein resin (ii) is modified with an unsaturated aliphatic diacid anhydride.

7. The cable defined in claim 2 whereto resin (i) is modified with an unsaturated aliphatic diacid anhydride.

8. The cable defined in claim 2 wherein resin (ii) is modified with an unsaturated aliphatic diacid anhydride.

9. The cable defined in claim 7 wherein resin (iii) is a copolymer of ethylene and vinyl acetate or ethyl acrylate.

10. The cable defined in claim 8 whereto resin (iii) is a copolymer of ethylene and vinyl acetate or ethyl acrylate.

11. The cable defined in claim 3 wherein resin (ii) is a copolymer of ethylene and vinyl acetate or ethyl acrylate.

* * * * *